United States Patent
Lentine et al.

(10) Patent No.: US 9,366,822 B1
(45) Date of Patent: Jun. 14, 2016

(54) THERMO-OPTICALLY TUNED PHOTONIC RESONATORS WITH CONCURRENT ELECTRICAL CONNECTION AND THERMAL ISOLATION

(71) Applicant: Sandia Corporation, Albuquerque, NM (US)

(72) Inventors: Anthony L. Lentine, Albuquerque, NM (US); Rohan Deodatta Kekatpure, Sunnyvale, CA (US); William A. Zortman, Albuquerque, NM (US); Daniel J. Savignon, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/869,482

(22) Filed: Sep. 29, 2015

(51) Int. Cl.
*G02B 6/293* (2006.01)
*G02B 6/12* (2006.01)

(52) U.S. Cl.
CPC ........ *G02B 6/29395* (2013.01); *G02B 6/12004* (2013.01); *G02B 6/29343* (2013.01); *G02B 6/29398* (2013.01)

(58) Field of Classification Search
CPC ...... G02B 6/43; G02B 6/12004; G02B 6/126; G02B 6/025; G02B 6/0147; G02B 6/12007; G02B 6/293; G02B 6/29338; G02B 6/12; G02B 6/122; G02F 1/035; G02F 1/3132; G02F 1/225; G02F 1/2555; G02F 1/011; G02F 1/0102; G02F 2000/008; G02F 2/004; H04B 10/505
USPC ...................................................... 385/1–14
See application file for complete search history.

(56) References Cited

U.S. PATENT DOCUMENTS

| | | | |
|---|---|---|---|
| 6,636,668 B1 | 10/2003 | Al-hemyari et al. | |
| 8,179,935 B2 | 5/2012 | Santori et al. | |
| 8,610,994 B1 | 12/2013 | Lentine et al. | |
| 8,615,173 B1 | 12/2013 | Lentine et al. | |
| 8,805,130 B2 * | 8/2014 | Lipson | G02B 6/12007 385/132 |
| 9,052,535 B1 * | 6/2015 | Zortman | G02F 1/015 |
| 9,081,135 B1 * | 7/2015 | Jones | G02F 1/025 |
| 9,081,215 B1 * | 7/2015 | Zortman | G02F 1/025 |
| 9,083,460 B1 * | 7/2015 | Zortman | H04B 10/50575 |

(Continued)

OTHER PUBLICATIONS

Padmaraju, Kishore et al., "Thermal stabilization of a mircroring modulator using feedback control", Dec. 17, 2012/vol. 20, No. 27/Optics Express, pp. 27999-28008.

(Continued)

*Primary Examiner* — Akm Enayet Ullah
(74) *Attorney, Agent, or Firm* — Martin I. Finston (57) ABSTRACT

A photonic resonator system is designed to use thermal tuning to adjust the resonant wavelength of each resonator in the system, with a separate tuning circuit associated with each resonator so that individual adjustments may be made. The common electrical ground connection between the tuning circuits is particularly formed to provide thermal isolation between adjacent resonators by including a capacitor along each return path to ground, where the presence of the capacitor's dielectric material provides the thermal isolation. The use of capacitively coupling necessarily requires the use of an AC current as an input to the heater element (conductor/resistor) of each resonator, where the RMS value of the AC signal is indicative of the amount of heat that is generated along the element and the degree of wavelength tuning that is obtained.

15 Claims, 4 Drawing Sheets

(56) References Cited

U.S. PATENT DOCUMENTS

| | | | | |
|---|---|---|---|---|
| 9,122,004 B1* | 9/2015 | Roth | ............... | G02B 6/12004 |
| 9,164,300 B2* | 10/2015 | Bernasconi | ............ | G02F 1/011 |
| 9,235,065 B1* | 1/2016 | Zortman | ............... | G02F 1/025 |
| 2003/0048975 A1* | 3/2003 | Lackritz | ............... | G02B 6/1221 |
| | | | | 385/14 |
| 2009/0220228 A1* | 9/2009 | Popovic | ............ | G02B 6/12007 |
| | | | | 398/48 |

OTHER PUBLICATIONS

DeRose, Christopher T. et al., "Silicon Microring Modulator with Integrated Heater and Temperature Sensor for Thermal Control", OSA/CLEO/QELS 2010.

Padmaraju, Kishore et al., "Resolving the thermal challenges for silicon microring resonator devices", 2013 Science Wise Publishing & De Gruyter, Nanophotonics 2013, pp. 1-13.

* cited by examiner

THERMO-OPTICALLY TUNED PHOTONIC RESONATORS WITH CONCURRENT ELECTRICAL CONNECTION AND THERMAL ISOLATION

STATEMENT OF GOVERNMENT INTEREST

This invention was developed under contract DE-AC04-94AL85000 between Sandia Corporation and the U. S. Department of Energy. The U.S. Government has certain rights in this invention.

BACKGROUND

Silicon photonic elements rely on the principle of resonance to achieve active and passive optical functionality such as filtering, dense wavelength division multiplexing (DWDM), modulation, and switching. Realizing these functions in an efficient manner critically depends on spectral alignment of resonance and operating wavelengths. Use of resonators with high quality factors (e.g., Q factors exceeding 1000) makes silicon microphotonic elements sensitive to variations in temperature and fabrication processes. Unpredictable, real-time changes in silicon chip temperature cause the spectral resonance location to shift from its desired value, which may worsen the insertion loss, contrast ratio, passband ripple, rejection ratio and, ultimately, the signal-to-noise ratio at an associated photoreceiver. These temperature-induced changes in the optical response of resonant devices are a dynamic effect.

Besides these temperature-induced dynamic changes, small variations in the fabricated dimensions of resonant devices can also create significant deviations in resonance location from a predetermined value, and can also lead to worsening in the optical figures of merit described above. Fabrication-induced changes in optical response are a static effect (as opposed to the dynamic temperature-induced changes). Together, variations in temperature and fabrication lead to enough time-dependent shifts in the photonic system response to warrant real-time monitoring and correction of resonance locations.

A prevalent technique to bring a resonant wavelength back to its design specification value is referred to as "thermo-optic tuning". It is known that the refractive index value of silicon—the base material used to form photonic resonators—is a function of temperature. Thus, by changing the temperature of the photonic resonator, its local refractive index will also change and the resonant wavelength will shift accordingly. Attractive features of thermo-optic tuning include its reversibility, unlimited number of tune-detune cycles, and allowance for tuning of individual resonators or resonator groups.

Thermo-optic tuning is typically provided by including a resistor-like element (as simple as a length of a metal conductor) in proximity to the optical resonator. A DC current is passed through the element, which generates heat by well-known effects. The amount of heat that is generated is a function of, among other things, the selected material composition of the conductive element, its topology, proximity to the resonator and value of DC current applied to the element.

In applications where two or more photonic resonators are used (common in many filtering and switching situations), each resonator is likely to be tuned to a different resonant wavelength. In this case, a separate heater element (and DC current source) is paired with each resonator. From a circuit design point of view, it is desirable to connect the various current sources to a common ground plane taking the form of a metallic connection (the ground line) between adjacent resonators. This common ground connection, however, creates an undesirable thermal path between adjacent resonators, making it difficult to tune closely-spaced resonators. That is, even if other means are being used to provide thermal isolation (such as, for example, physical separation between adjacent photonic resonators), the utilization of a common ground connection provides a thermal path to transfer unwanted (and unpredictable) heat from one resonator to another.

A need remains, therefore, for a way to maintain an electrical connection between adjacent photonic resonators while still keeping them thermally isolated so that individual resonant wavelength tuning can be performed.

SUMMARY

The following is a brief summary of subject matter that is described in greater detail herein. This summary is not intended to be limiting as to the scope of the claims.

Various embodiments of the present invention as described in detail herein relate to a photonic resonator configuration that utilizes a common electrical ground connection between the driver circuits used to provide thermal tuning, where each resonator's ground connection is capacitively coupled to provide thermal isolation by creating a break in the heat transfer path between adjacent resonators.

Inasmuch as capacitive coupling relies on the inclusion of dielectric material between a pair of metallic plates, the well-known high thermal isolation property of the dielectric material functions as way to break the heat transfer path between adjacent resonators. Because capacitors block direct current, a capacitively-coupled heater element must be energized by an ac current, in contradistinction to the dc thermal tuning signal of the prior art. For ac thermal tuning, the rms value of the ac signal is indicative of the thermal power generated along the heater element. The heater element itself may comprise a metal conductor, resistor, or any other structure capable of generating heat upon the application of an AC current.

Advantageously, the use of silicon-based systems in the formation of a photonic resonator structure allows for conventional CMOS processing techniques to be used for including capacitive structures within the ground plane connection.

Capacitive coupling may also be included along the input signal line to provide for additional thermal isolation within the photonic resonator structure.

BRIEF DESCRIPTION OF THE DRAWINGS

Referring now to the drawings, where like numerals represent like parts in several views.

DETAILED DESCRIPTION, INCLUDING EXAMPLES

Figure 1:
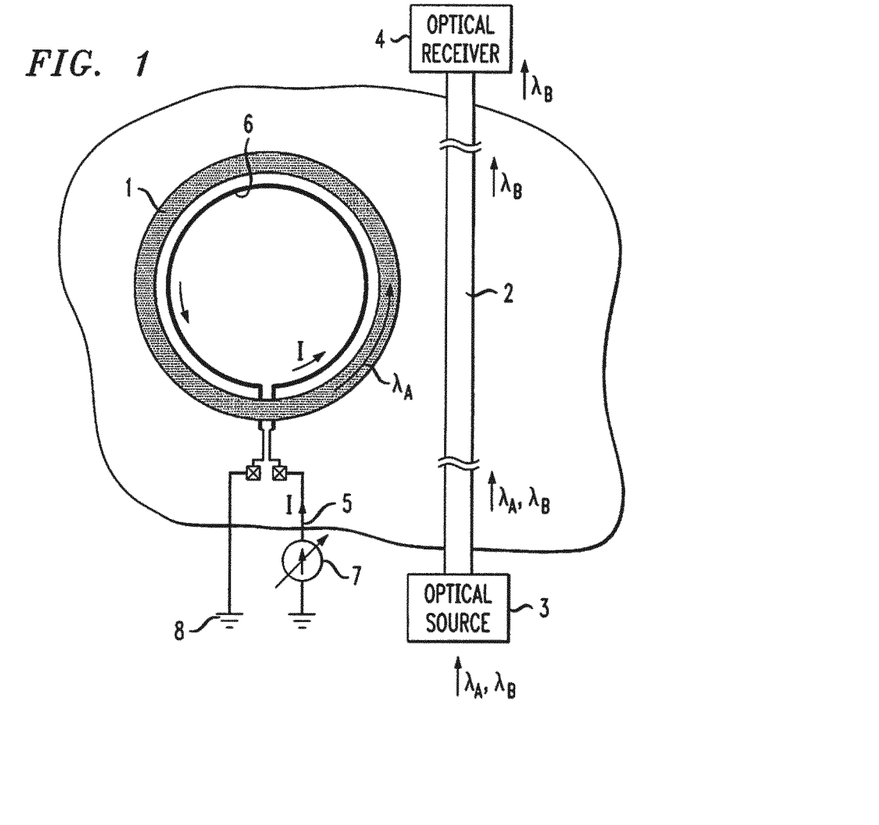
FIG. 1 illustrates a typical prior art photonic resonator, including a heater element to provide for thermo-optic tuning.

FIG. 1 depicts a conventional prior art photonic resonator that includes a thermo-optic element to provide resonant wavelength tuning. As shown, the resonator includes a first optical waveguide 1 arranged in a loop, in this case forming a resonant "ring". A second, tangential optical waveguide 2 is disposed adjacent to ring 1. An optical source 3 is coupled as an input to optical waveguide 2, and provides multiple signals, operating at different wavelengths, along optical waveguide 2. In this example, it is presumed that the input includes signals operating at $\lambda_A$ and $\lambda_B$, and ring resonator 1 is configured to have $\lambda_A$ as its resonant wavelength. Therefore, as the two signal wavelengths propagate along waveguide 2, the signal at $\lambda_A$ will be evanescently coupled into ring resonator 1, and the signal at $\lambda_B$ will continue to propagate along waveguide 2 into an optical receiver 4.

The resonant wavelength $\lambda_A$ of ring 1 is at least partially determined by the cross-sectional dimensions of ring 1 and waveguide 2, the materials forming the resonator and the operating temperature of the system. As mentioned above, temperature and fabrication variations are known to affect the resonant wavelength. Under certain conditions, therefore, it is possible that the resonant wavelength of ring resonator 1 may drift away from $\lambda_A$ to the extent that the signal is no longer captured by the resonator. A thermo-optic controller system may therefore be used to monitor the resonant wavelength and provide thermal tuning to maintain the resonant wavelength within a given tolerance around $\lambda_A$.

The thermo-optic controller 5 as shown in FIG. 1 includes a heating coil 6 of electrically conducting material disposed around the periphery of ring resonator 1. Heat is generated by passing a current from a DC current source 7 through heating coil 6 (which then returns to ground connection 8). The resonant wavelength can therefore be controlled by appropriately increasing or decreasing the amount of current injected into heating coil 6 by source 7.

Figure 2:
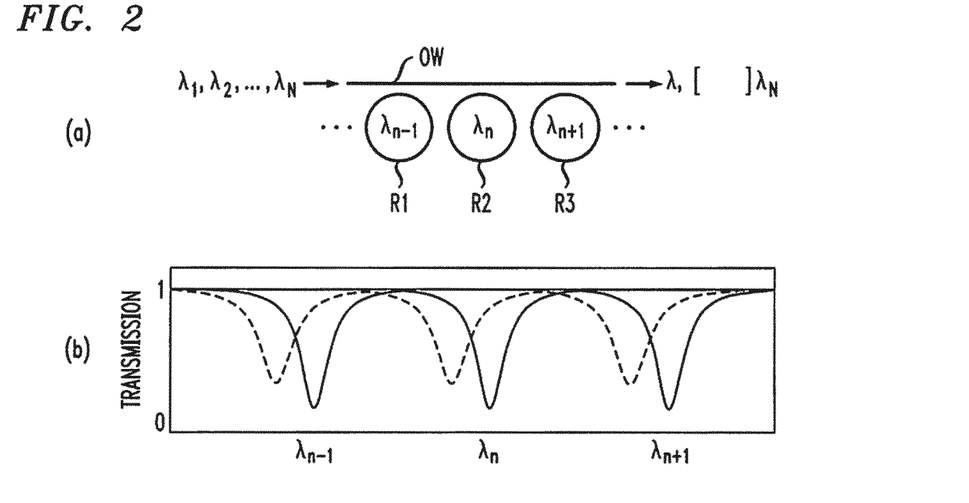
FIG. 2 is a diagram showing multiple resonators disposed along a waveguide, illustrating the different resonant wavelengths associated with each resonator, as well as the wavelength drift that may occur.

There are many applications for photonic resonators where it is necessary to utilize a group of resonators situated in close proximity to one another. FIG. 2 illustrates, in simplified form, one such application. Referring to FIG. 2(a), an optical add/drop system is shown in simplified form, depicted as an optical waveguide OW capable of supporting the transmission of signals operating at various wavelengths, and a set of three ring resonators R1, R2, and R3, each resonator exhibiting a different resonant wavelength $\lambda_{n-1}$, $\lambda_n$ and $\lambda_{n+1}$. FIG. 2(b) is a plot showing these resonant wavelengths, where the dotted line plot illustrates the drift in wavelength than can occur as a result of thermal and fabrication variations.

Figure 3:
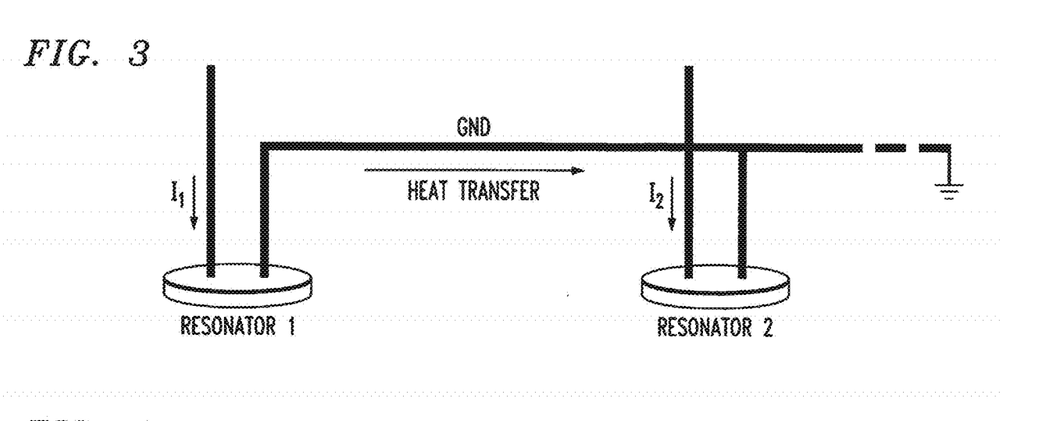
FIG. 3 depicts a particular configuration of the arrangement of FIG. 2, where the drive circuits for the resonators are connected to a common ground plane.

It is possible to utilize the thermo-optic resonant wavelength tuning arrangement, as shown in FIG. 1, with each ring resonator of FIG. 2(a), including a heating coil disposed on each ring and a separate DC current source for controlling the amount of current injected into each separate heating coil. From a circuit design viewpoint, it is desirable to connect these separate current sources to a common ground plane. A common ground connection, however, requires a metallic connection between adjacent resonators. FIG. 3 depicts this arrangement, in simplified form, with a common ground connection between resonator 1 and resonator 2. The presence of this common ground connection defeats the thermal isolation between adjacent resonators by providing a path for heat transfer between the resonators. This thermal coupling along the ground connection makes it difficult to tune closely-spaced resonators and maintain acceptable resonance conditions, even when other types of thermal isolation (e.g., physical barriers) have been included in the system.

The present invention addresses this problem and provides a solution that allows for the common electrical ground connection to be maintained while concurrently providing thermal isolation between adjacent resonators along the ground connection. In particular, a capacitive coupling arrangement is used, where the capacitor allows for the electrical connection to be maintained. The dielectric material of the capacitor exhibits the thermal insulative properties sufficient to provide the necessary thermal isolation between the resonators.

Figure 4:
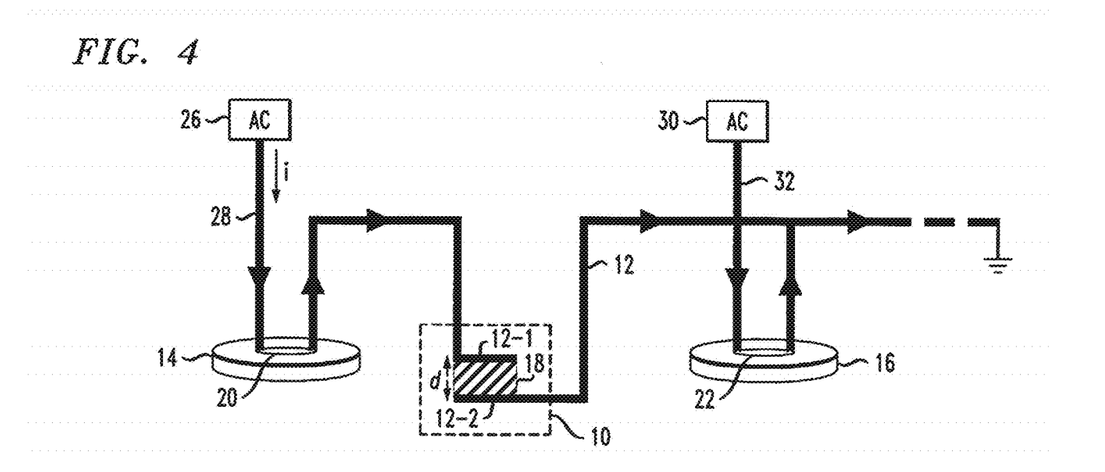
FIG. 4 illustrates an exemplary resonator structure formed in accordance with the present invention to include a capacitor between the heater element and the ground plane, the capacitor providing thermal isolation between the resonator and the ground plane.

FIG. 4 is a simple diagram illustrating the principles of the present invention as applied to the configuration of FIG. 3. As shown, a capacitor 10 is disposed in series along a ground connection 12 between a first photonic resonator 14 and a second photonic resonator 16. While shown as disk resonators in this example, it is to be understood that various types of photonic resonators (ring, track, disk, etc.) may be used in the performance of the present invention.

As shown in FIG. 4, capacitor 10 is formed by disposing a dielectric material 18 (such as $SiO_2$) between sections 12-1 and 12-2 of ground connection 12 (sections 12-1 and 12-2 forming the opposing plates of the capacitor structure). It is well known that dielectric materials, including $SiO_2$, are very good thermal insulators. The presence of dielectric material 18, therefore, functions to break the heat transfer path between first photonic resonator 14 and second photonic resonator 16. By virtue of creating this thermal isolation between adjacent resonators, each may be thermally tuned to maintain resonant wavelength control without concern of using a common electrical ground connection.

The inclusion of capacitive coupling necessitates the use of an alternating current as the thermal tuning input, as opposed to the direct current used in the prior art, since the capacitor structure will block the flow of a DC current. The configuration of FIG. 4 shows a thermo-optic wavelength tuning configuration in the form of a first AC source 26 for supplying an AC input current along an input signal path 28 to a heating coil 20 of first photonic resonator 14. Heating coil 20 may comprise a simple metal strip that follows the contour of the resonator, a resistive element, or any other configuration that is able to generate heat upon the application of an AC signal. In specific embodiments, the heating is provided by an element formed within the same silicon body as the optical resonator, using appropriate doping to form the element and adding ohmic contacts to provide electrical connection to the AC source. A second thermo-optic wavelength tuning arrangement is shown as including an AC source 30 for supplying an AC input current along signal path 32 to a heating coil 22 (or any other suitable type of heating element) of second photonic resonator 16. The RMS value of the AC signals is used in the determination of the amount of heat that will be generated in each heating coil.

Capacitance of parallel plate capacitor 10 as shown in FIG. 4 is given approximately by the relation $$C = \frac{\varepsilon_0 A K}{d},$$

where A is the plate area of 12-1, 12-2, K is the dielectric constant of dielectric region 18, d is the spacing between 12-1 and 12-2 (as shown in FIG. 4), and $\varepsilon_0$ is the vacuum permittivity constant. Electrical impedance of a capacitor is given by:

$$Z = \frac{1}{(j2\pi f C)},$$

where C is the capacitance (as defined above), f is the frequency of the AC signal, and j is the imaginary unit. Therefore, with increasing frequency, a capacitor becomes an increasingly good conductor of alternating current. Upon encountering a resistance R (such as that present along heating coil 20 of photonic resonator 14), this alternating current generates heat at a rate proportional to the resistance R times the square of the RMS current value. Thus, it is possible in accordance with the present invention to provide thermal tuning of photonic resonators in a configuration where a common electrical ground plane is maintained, but the unwanted thermal transfer from one resonator to another is suppressed.

For efficient, low-power tuning, most of the voltage drop should occur across the resonator structure, i.e., across the heating coil or other resistive element (which will typically be integrated with the resonator). If the impedance of the coupling capacitor (or capacitors) is too large, there will be (for a fixed current) a competing voltage drop across the capacitors. Hence, the capacitive impedance should be minimized for optimum results in terms of tuning efficiency. If the drive frequency f is fixed, a smaller impedance needs a large value of the capacitor C, which in turn needs either a large area A or small plate separation d. Smaller values of d lead to a thinner insulating layer and, consequently, a lesser degree of thermal isolation. A large value of the plate area A consumes valuable chip area, clearly not a preferred alternative.

In accordance with the present invention, therefore, a main design tradeoff for capacitively-connected photonic resonators is the efficiency of heat generation in the ring resonator structure versus the degree of thermal isolation desired and size of the capacitor used. Various designs for creating the capacitor, particularly the selection of dielectric material, separation d and plate area A can be included in the selection process for obtaining the best results for a particular application. Thus, the thermo-optic tuning efficiency of the capacitively-coupled resonator structure of the present invention depends primarily on the relative voltage drop across the resonator's heater coil and the capacitor design.

Figure 5:
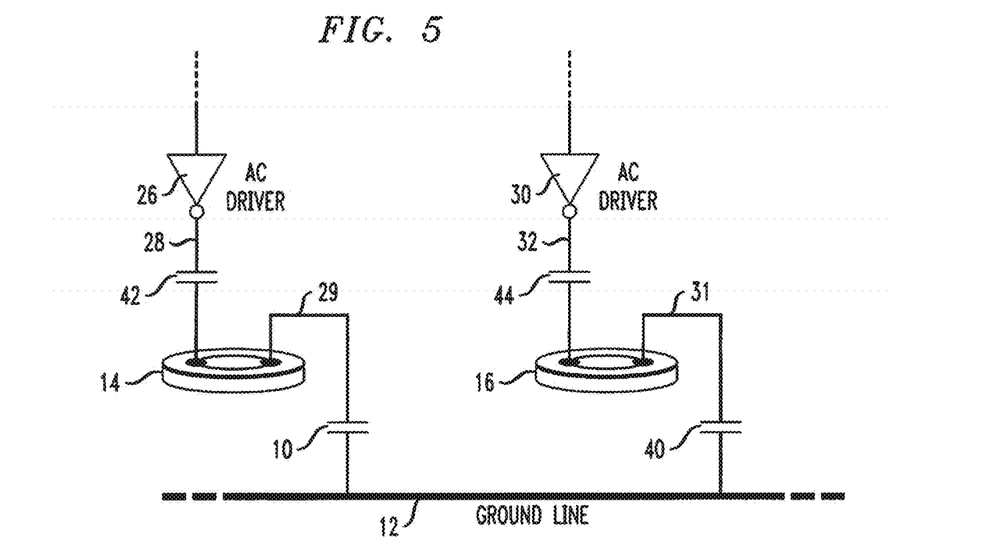
FIG. 5 illustrates another embodiment of the present invention, in this case utilizing a common ground bus signal path, and each resonator's driver circuit separately capacitively-coupled to the common ground bus signal path.

It is to be understood that the possible configurations of resonators and capacitors are not limited to the direct capacitive connection as shown in FIG. 4. In particular, FIG. 5 illustrates an alternative embodiment of capacitively-coupled photonic resonators formed in accordance with the present invention. In this configuration, electric ground connection 12 is shown as a common bus interconnection. Capacitor 10, as described above, is disposed between the ground connection 29 of heater element 20 and ground line 12. Also shown in this configuration is an isolation capacitor 40 disposed between a ground connection 31 of heater element 22 and ground line 12. Obviously, additional photonic resonators that may be added in sequence along with those illustrated in FIG. 5 would include a similar capacitive connection between the ground signal line of the heater element and ground line 12.

In addition, it is contemplated that the input signal line may be capacitively connected as well. The arrangement as shown in FIG. 5 includes a first input capacitor 42 disposed along input signal line 28 and a second input capacitor 44 disposed along input signal line 32. As will be discussed below in association with FIG. 6, it is possible that the specific assembly of the components will include an electrical integrated circuit within which the AC driver circuits and monitoring electronics will be formed, as well as a photonic integrated circuit where the resonators, waveguides and heater elements will be formed. The electronic component could exhibit an elevated temperature while also having a fairly low thermal impedance from one signal line to the next via the transistors and grounds on the electronic chip. Thus, waste heat generated in the electronic chip can propagate to the resonator assembly along signal lines, such as lines 28 and 32 of FIG. 5. This problem can be mitigated by adding capacitors 42, 44 to provide thermal isolation in accordance with the present invention.

Figure 6:
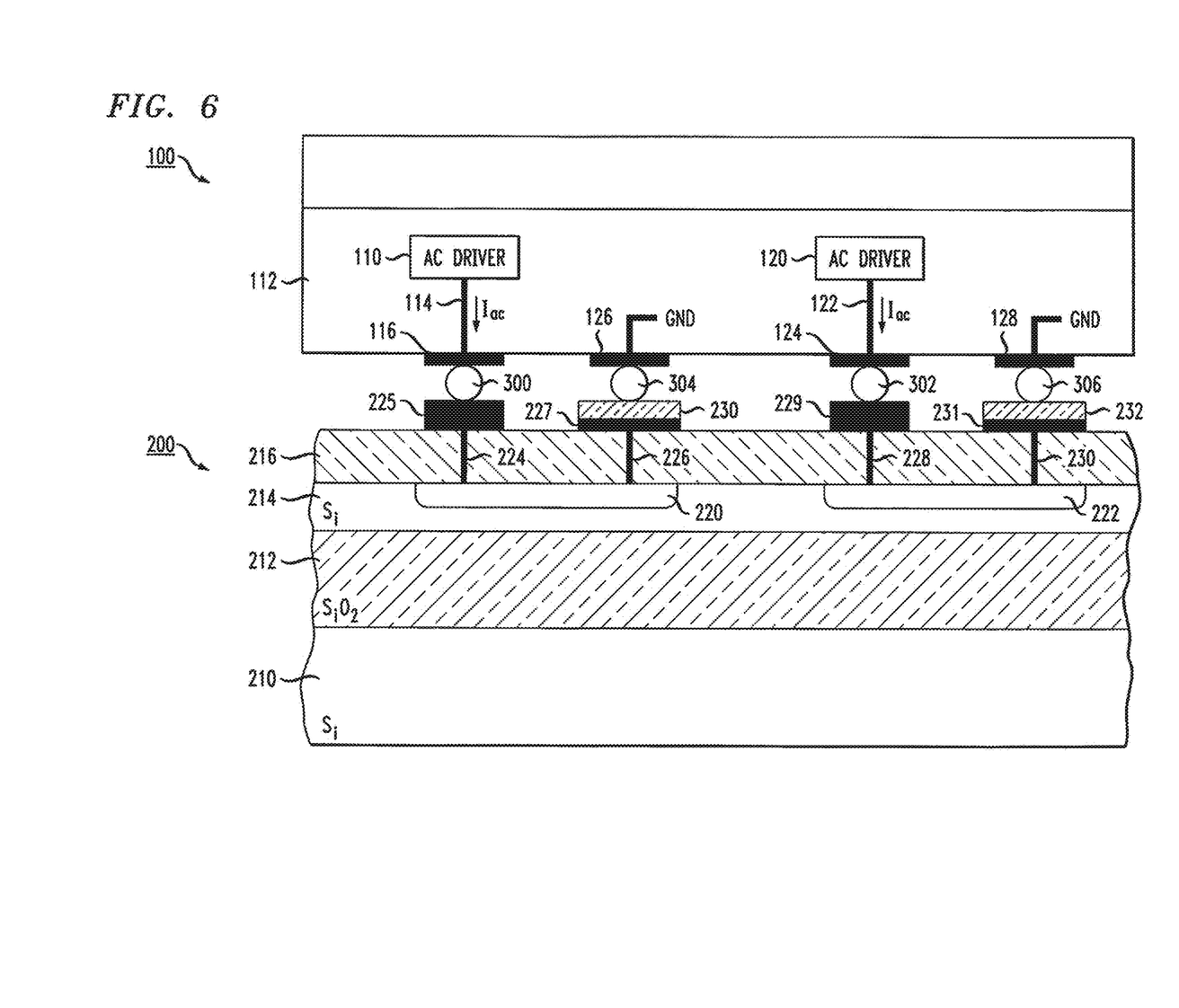
FIG. 6 depicts a silicon-based "flip-chip" embodiment of the present invention, including capacitive coupling between the ground connections on the electronics-based chip and the ground connections on the photonics-based chip.

FIG. 6 is a simplified diagram of an exemplary flip-chip connection of an electrical integrated circuit 100 (including, among other components, the AC driver circuits for the tunable photonic resonators of the present invention) and a photonic integrated circuit 200 (including, among other components, the photonic resonators, optical waveguides and heater elements). Photonic integrated circuit 200 typically comprises a silicon-on-insulator (SOT) structure formed of a silicon substrate 210 and an oxide layer 212 disposed over silicon substrate 210 (oxide layer 212 is referred to at times as a "buried oxide layer", or simply "BOX"). A relatively thin single crystal silicon surface layer 214 is formed over buried oxide layer 212 and the various photonic devices are formed, using standard CMOS processing techniques, within thin silicon surface layer 214. For the sake of discussion, the optical elements are shown as a first region 220 within which a first photonic resonator has been formed and a second region 222 within which a second photonic resonator has been formed.

A typical silicon photonics wafer has approximately 3 μm of buried oxide 212 below silicon layer 214, which itself has a thickness of about 225 nm. Once the optical elements have been formed in silicon surface layer 214, a second layer of oxide material, shown in this case as oxide layer 216, is formed to cover the top surface of the structure. The electric contacts to regions 220 and 222 (necessary to provide the AC current input to the heater elements) are achieved by etching via holes through the thickness of oxide layer 216 in the appropriate locations and filling the via holes with metal. These electrical contacts are shown as via elements 224, 226, 228 and 230 in FIG. 6. A top metal pad is shown as in contact with each of the vias; namely, pad 225 with element 224, pad 227 with element 226, pad 229 with element 228 and pad 231 with element 230.

Electrical IC chip 100 includes, as mentioned above, the AC driver circuits necessary to provide thermal tuning of the resonant wavelengths for the resonators included within photonic IC 200. A simplified layer structure for these driver circuits is shown in FIG. 6. Transistors associated with a first AC driver circuit 110 are formed within a layer 112 of chip 100. The AC current generated by first AC driver circuit 110 is passed through a via connection 114 to a metal contact pad 116 on the top surface of electrical IC chip 100. Similarly, transistors associated with a second AC driver circuit 120 are formed within a separate region within layer 112, with the generated AC current passing through a via connection 122 and onto metal contact pad 124.

In this flip-chip configuration, electrical IC chip 100 is "flipped" and attached to photonic chip 200 in the manner shown, with the top surface of chip 100 facing the top surface of chip 200. A plurality of solder bumps is used to provide electrical connection between the associated contact pads. In particular, a first solder bump 300 is used to provide electrical connection between contact pad 116 of chip 100 and contact pad 225 of first resonator 114, providing a path for the AC drive signal from the circuit on chip 100 to the resonator on chip 200. A second solder bump 302 provides a similar AC tuning current signal path connection between pad 124 and contact pad 229.

As discussed in detail above, the drive circuits also include ground connections, which are preferably coupled together to create a common ground plane. In accordance with the present invention, each resonator is capacitively coupled to the ground plane in order to provide thermal isolation between adjacent resonators while maintaining the common electrical connection along the ground plane. This capacitive connection is formed in the configuration of FIG. 6 by forming a capacitive connection along the return ground path between photonic chip 200 and electrical IC chip 100.

Referring to FIG. 6, capacitively-coupled ground connections may be created in this exemplary embodiment by including a layer of dielectric material over each ground contact pad on photonic chip 200. As shown a first dielectric layer 230 is disposed to cover contact pad 227 (associated with the first resonator structure) and a second dielectric layer 232 is disposed to cover contact pad 231 (associated with the second resonator structure). Solder bump connections 304 and 306 are coupled to dielectric layers 230 and 232, respectively, and provide a signal path to ground layer contacts 126 and 128 on electrical IC chip 100. In this manner, a capacitor is formed where, for example, contact pad 227 forms a first plate and the combination of solder bump 304 and contact pad 124 forms a second plate (with dielectric layer 230 between the pair of plates). Layer 231 and the combination of solder bump 306 and ground contact pad 128 form a similar pair of plates for the second resonator capacitively-coupled connection.

It is to be noted that there are many different types of capacitively-coupled structures that may be easily incorporated in a silicon-based arrangement such as that shown in FIG. 6. For example, many other dielectric materials besides SiO2 may be used, where certain materials are known to exhibit greater degrees of thermal isolation while being a relatively thin layer. (Hafnium dioxide is one exemplary material that is a high K dielectric which exhibits good thermal isolation.) Other capacitive structures, such as a metal-oxide-semiconductor (MOS) capacitor may be formed within "flip chip" structure and provide the desired electrical conductivity along the ground plane while blocking heat transfer between adjacent resonators. In the particular use of a MOS capacitor, a 10-nm layer of hafnium dioxide may be used. This arrangement would therefore reduce the undesired voltage drop across the capacitor relative to an $SiO_2$ capacitor of a smaller value.

Figure 7:
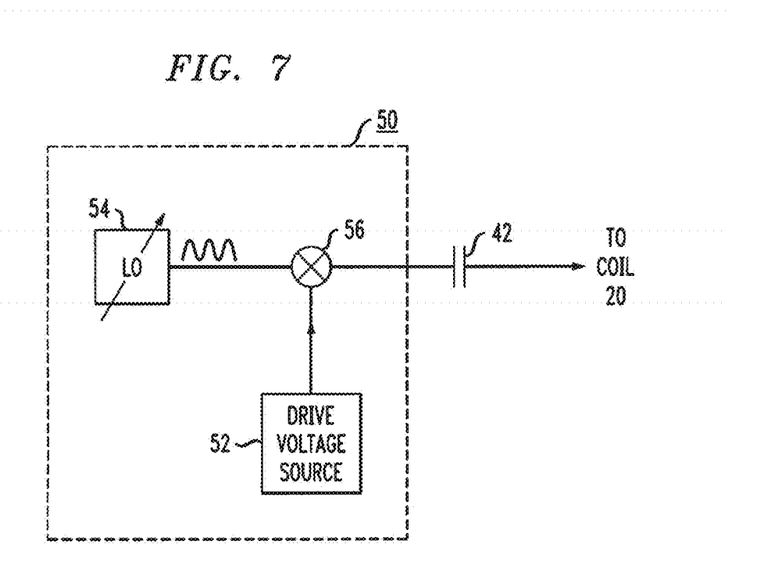
FIG. 7 illustrates an exemplary RF modulator that may be used as an AC driver circuit for providing thermo-optic tuning in accordance with the present invention.

As noted, an AC driving circuit is needed to be incorporated into the thermo-optic tuning structure of the present invention. FIG. 7 illustrates an exemplary arrangement for AC driving circuit 26 of FIG. 5, in this case taking the form of an RF modulator 50. RF modulator 50 is shown as comprising a voltage source 52 (of a DC analog voltage) and a local oscillator (LO) 54. The output signals from voltage source 52 and LO 54 are combined within a multiplier 56 to create the AC current output signal utilized as the drive current input for thermo-optic tuning. As shown, this output is then coupled into signal path 28, passing through capacitor 42, and then into heater coil 20 (as shown in FIG. 5).

In embodiments of the present invention, LO 54 can be made adjustable; that is, it can be configured to generate an output at different frequency values. As is well known, the amount of heat generated within the associated coil will be function of the RMS value of the current, which will be frequency dependent if driven by a voltage source. Hence, frequency control can provide one approach for controlling the heater.

In comparison to the DC-based tuning arrangements of the prior art, the utilization of an AC driver in accordance with the present invention necessarily results in both positive and negative bias on each pulse. One problem with the prior art DC-based heater designs is that they are affected by electromigration. That is, since the heater is almost always "on" with some current moving in the same direction for the life of the device, it is possible for the heater coil to start to break down, or at least experience intermittent failures. Of course, the heating provided by the coil is necessarily impacted by the presence of electromigration.

The utilization of an AC drive current, in accordance with the present invention, eliminates the possibility of electromigration, since the applied current will always move in both directions an equal amount of time.

Pulse-width modulation (PWM) is another type of signal processing that may be used to provide an input signal in the capacitively-coupled thermo-optic tuning arrangement of the present invention. The only drawback here is that the low frequency cut-off of the PWM signal must be high enough to allow for a fairly small on-chip capacitor to be used.

Although the invention is illustrated and described herein with reference to specification embodiments, the invention is not intended to be limited to the details shown. Rather, various modifications may be made in the details within the scope and range of equivalents of the claims and without departing from the invention.

What is claimed is:

1. An optical resonator configuration having a thermally-tunable resonant wavelength comprising:
   a photonic resonator formed to exhibit an adjustable resonant wavelength;
   an optical waveguide disposed adjacent to the photonic resonator in a manner such that an optical signal propagating along the optical waveguide at a resonant wavelength is coupled into the photonic resonator;
   a heat-generating element disposed in proximity to the photonic resonator;
   an alternating-current (AC) signal source coupled to the heat-generating element for providing an input current to the heat-generating element wherein the presence of the input current passing along the heat-generating element changes the temperature of the photonic resonator in a manner that adjusts the resonant wavelength of the photonic resonator; and
   a capacitor disposed along the return signal path between the heat-generating element and a ground connection associated with the AC signal source for providing thermal isolation along the return path while maintaining an electrical connection.

2. The optical resonator configuration as defined in claim 1 wherein the configuration is formed in a silicon-based system.

3. The optical resonator configuration as defined in claim 1 wherein the heat-generating element comprises a length of conductive material.

4. The optical resonator configuration as defined in claim 3 wherein the heat-generating length of conductive material is disposed to follow a predetermined topology of the photonic resonator.

5. The optical resonator configuration as defined in claim 1 wherein the heat-generating element comprises a resistive element.

6. The optical resonator configuration as defined in claim 1 wherein the photonic resonator comprises a ring resonator.

7. The optical resonator configuration as defined in claim 6 wherein the ring resonator has a circular periphery and the heat-generating element comprises a conductive coil disposed to follow the circular periphery of the ring resonator.

8. The optical resonator configuration as defined in claim 1 wherein the configuration further comprises a capacitor disposed along an input signal path between the AC signal source and the heat-generating element, the capacitor preventing unwanted heat generation along the input signal path.

9. An optical system comprising
  an optical waveguide for support the propagation of a plurality of different optical signals, each operating at a different signal wavelength;
  a plurality of photonic resonators disposed adjacent to the optical waveguide, each photonic resonator configured to exhibit a different, tunable resonant wavelength;
  a plurality of thermo-optic wavelength tuning arrangements, each associated with the plurality of photonic resonators in a one-to-one relationship, with the plurality of thermo-optic wavelength tuning arrangements coupled to a common ground plane connection, each thermo-optic wavelength tuning arrangement comprising:
    a heat-generating element disposed in proximity to its associated photonic resonator;
    an alternating-current (AC) signal source coupled to the heat-generating element for providing an input current to the heat-generating element wherein the presence of the input current passing along the heat-generating element changes the temperature of the associated photonic resonator in a manner that adjusts the resonant wavelength of the photonic resonator; and
    a capacitor disposed along the return signal path between the heat-generating element and the common ground connection of the plurality of thermo-optic wavelength tuning arrangements, the capacitor providing thermal isolation along the return path while maintaining an electrical connection to the common ground plane.

10. The optical system as defined in claim 9 wherein the system comprises a silicon-based system.

11. The optical system as defined in claim 9 wherein at least one heat-generating element comprises a length of conductive material.

12. The optical system as defined in claim 11 wherein the at least one heat-generating element formed of conductive material is disposed to follow a predetermined topology of the associated photonic resonator.

13. The optical system as defined in claim 9 wherein at least one heat-generating element comprises a resistive element.

14. The optical system as defined in claim 9 wherein the plurality of photonic resonators comprises a plurality of ring resonators.

15. The optical system as defined in claim 9 wherein at least one thermo-optic wavelength tuning arrangement further comprises a capacitor disposed along an input signal path between the AC signal source and the heat-generating element, the capacitor preventing unwanted heat generation along the input signal path.

\* \* \* \* \*